(12) United States Patent
Baumgartner et al.

(10) Patent No.: US 9,334,909 B2
(45) Date of Patent: May 10, 2016

(54) DISC BRAKE FOR VEHICLES

(71) Applicant: KNORR-BREMSE Systeme fuer Nutzfahrzeuge GmbH, Munich (DE)

(72) Inventors: Johann Baumgartner, Moosburg (DE); Alexander Werth, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/517,455

(22) Filed: Oct. 17, 2014

(65) Prior Publication Data

US 2015/0034429 A1 Feb. 5, 2015

Related U.S. Application Data

(63) Continuation of application No. PCT/EP2013/001178, filed on Apr. 19, 2013.

(30) Foreign Application Priority Data

Apr. 20, 2012 (DE) .......................... 10 2012 008 003

(51) Int. Cl.
*F16D 55/226* (2006.01)
*F16D 65/00* (2006.01)
*F16D 55/00* (2006.01)

(52) U.S. Cl.
CPC ............ *F16D 65/0075* (2013.01); *F16D 55/00* (2013.01); *F16D 55/226* (2013.01); *F16D 2055/002* (2013.01); *F16D 2250/0023* (2013.01); *F16D 2250/0084* (2013.01)

(58) Field of Classification Search
CPC .................. F16D 2055/002; F16D 2055/0016; F16D 65/0068; F16D 65/0075; F16D 2250/0023; F16D 55/226

See application file for complete search history.

(56) References Cited

U.S. PATENT DOCUMENTS

| 3,363,727 | A | * | 1/1968 | Thirion ................. F16D 55/226 |
| | | | | 188/205 R |
| 4,570,759 | A | | 2/1986 | Ferret Bofill et al. |
| 6,105,734 | A | | 8/2000 | Kuehne et al. |
| 7,793,765 | B2 | | 9/2010 | Valvano et al. |
| 2002/0043435 | A1 | | 4/2002 | Reeves |
| 2003/0010580 | A1 | | 1/2003 | Nakamura |

(Continued)

FOREIGN PATENT DOCUMENTS

| AU | EP 0359548 A1 | * | 3/1990 | ............ F16D 55/226 |
| CN | 1348534 A | | 5/2002 | |

(Continued)

OTHER PUBLICATIONS

International Search Report dated Aug. 6, 2013 with English translation (six (6) pages).

(Continued)

*Primary Examiner* — Anna Momper
(74) *Attorney, Agent, or Firm* — Crowell & Moring LLP

(57) ABSTRACT

A disc brake for vehicles, in particular for commercial vehicles, includes brake pads which are arranged on both sides of a brake disc, a brake application device for applying one of the brake pads and a brake caliper for transmitting the application force to the brake pad on the other side, that is to say on the reaction side, of the brake disc. The brake caliper of the disc brake has a caliper frame which is produced from a shaped hollow profile.

20 Claims, 4 Drawing Sheets

(56) References Cited

U.S. PATENT DOCUMENTS

| | | | |
|---|---|---|---|
| 2004/0195054 A1* | 10/2004 | Thomas | F16D 55/224 188/73.1 |
| 2005/0284710 A1 | 12/2005 | Roberts et al. | |
| 2006/0054425 A1 | 3/2006 | Maehara | |
| 2007/0158143 A1* | 7/2007 | Valvano | F16D 55/227 188/71.5 |

FOREIGN PATENT DOCUMENTS

| | | | | |
|---|---|---|---|---|
| CN | 1397467 A | | 2/2003 | |
| CN | 1737398 A | | 2/2006 | |
| DE | 2163586 A1 | * | 7/1972 | F16D 55/226 |
| DE | 37 16 202 A1 | | 11/1988 | |
| DE | 4036272 A1 | * | 5/1992 | F16D 55/226 |
| DE | 42 36 683 A1 | | 5/1994 | |
| DE | 196 42 384 A1 | | 4/1998 | |
| DE | 19652123 A1 | * | 6/1998 | F16D 55/224 |
| DE | 298 18 886 U1 | | 4/1999 | |
| DE | 198 29 577 A1 | | 1/2000 | |
| DE | 198 33 006 A1 | | 2/2000 | |
| EP | 0 108 680 A1 | | 5/1984 | |
| EP | 0 995 919 B1 | | 2/2006 | |
| GB | 702702 A | * | 1/1954 | F16D 55/228 |
| GB | 2016617 A | * | 9/1979 | F16D 55/226 |

OTHER PUBLICATIONS

German Office Action dated Feb. 6, 2013 (six (6) pages).
International Preliminary Report on Patentability (PCT/IB/326 & PCT/IB/373), including Written Opinion (PCT/ISA/237) dated Oct. 30, 2014 with English-language translation (Ten (10) pages).
Chinese Office Action issued in counterpart Chinese Application No. 201380025213.3 dated Feb. 16, 2016 with English-language translation (nine (9) pages).

* cited by examiner

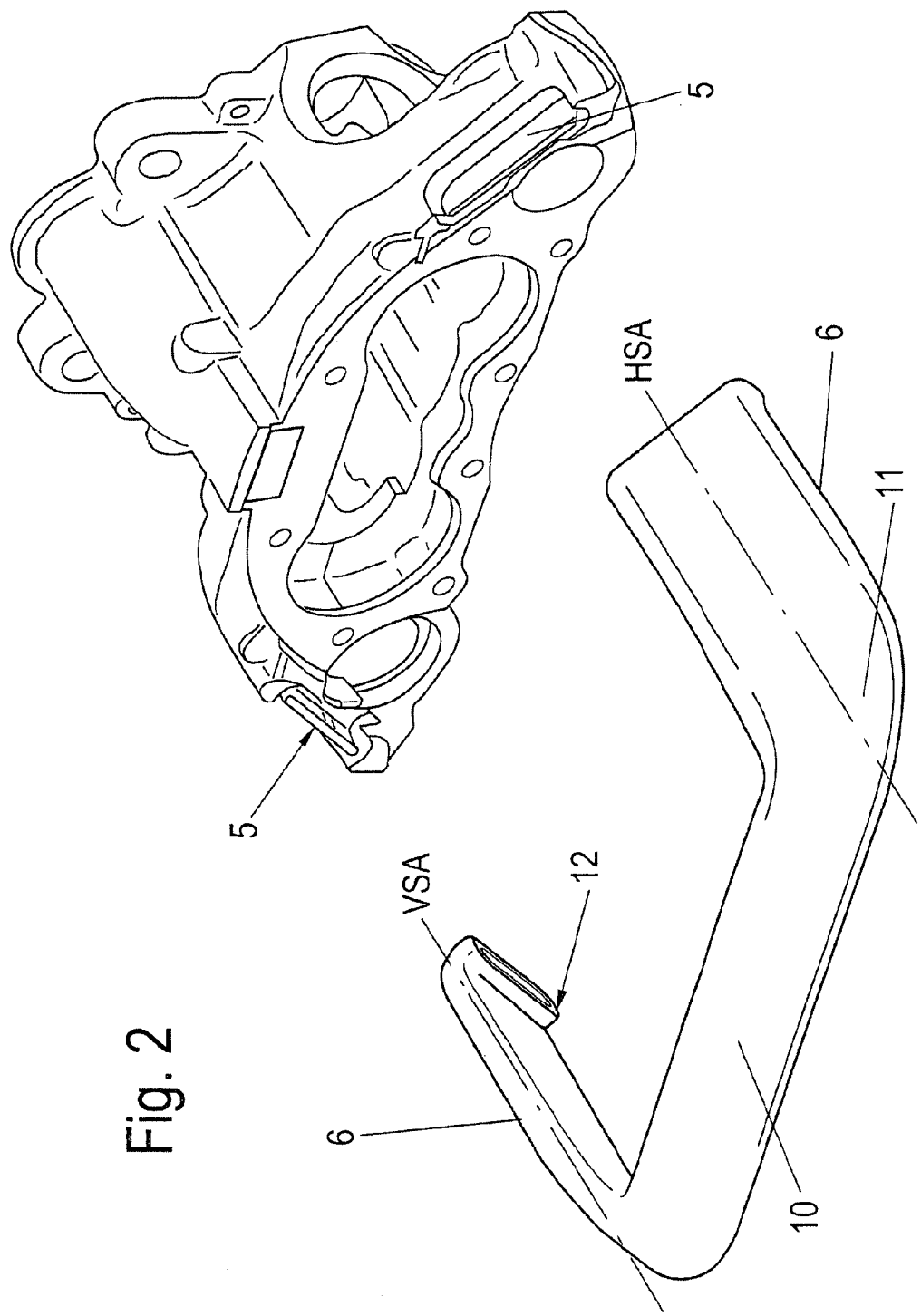

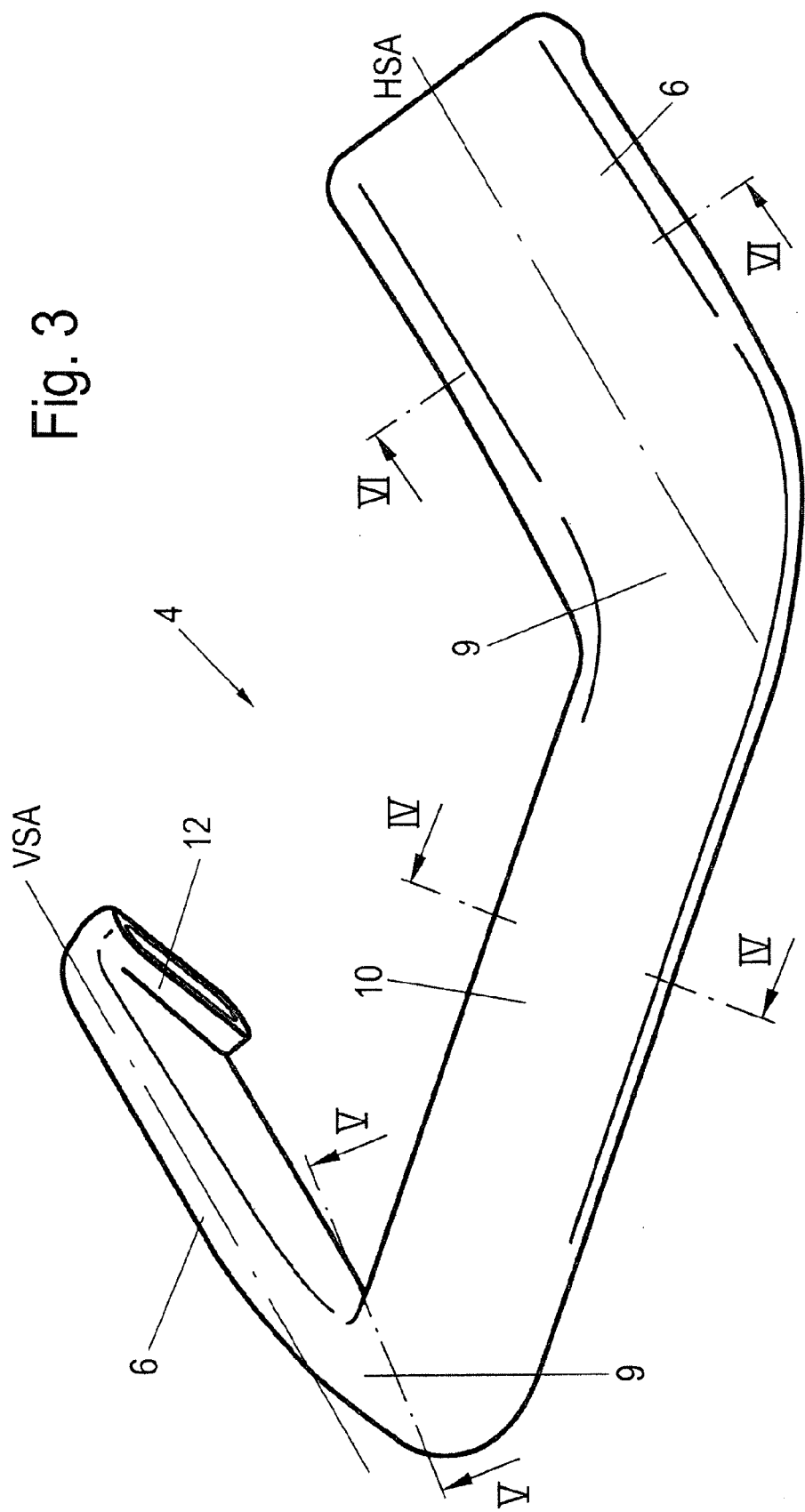

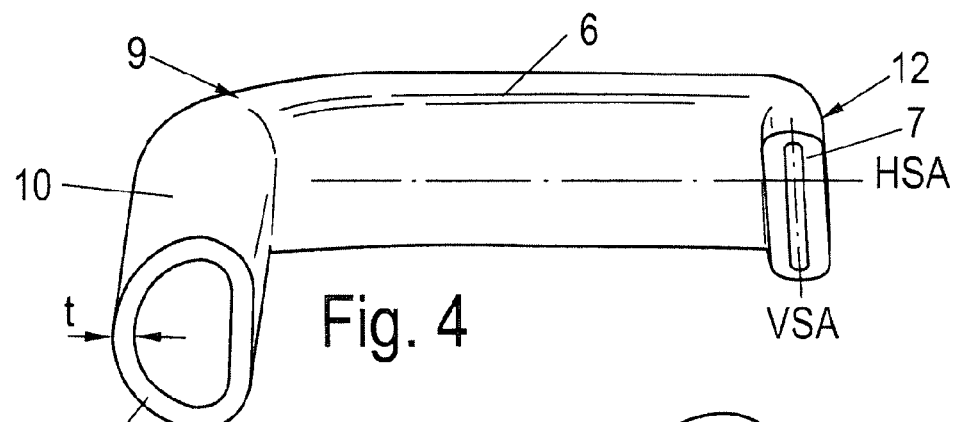
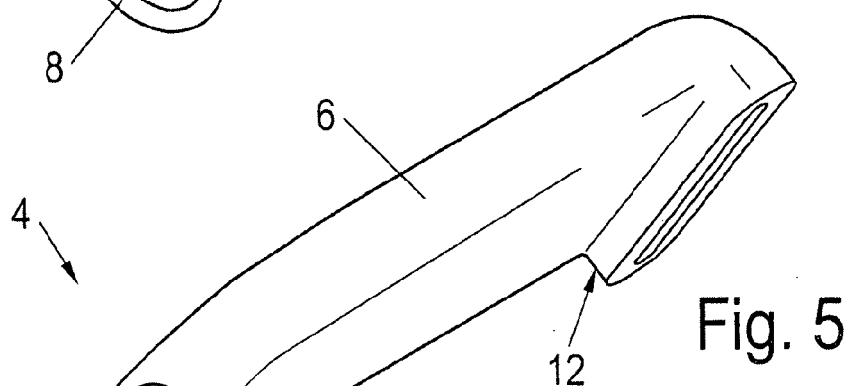
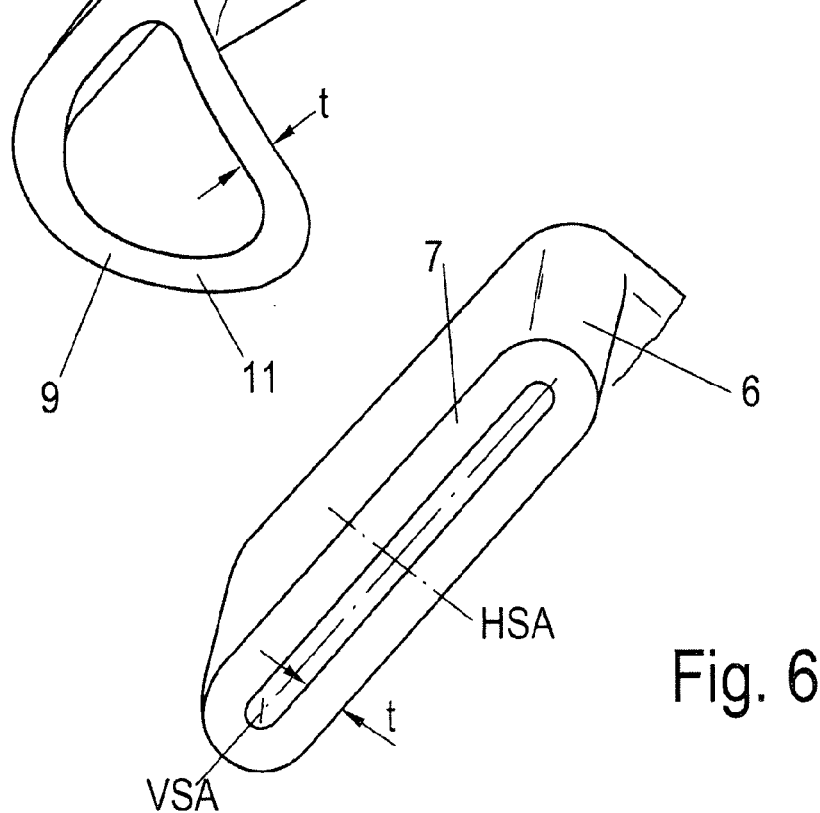

DISC BRAKE FOR VEHICLES

CROSS REFERENCE TO RELATED APPLICATIONS

This application is a continuation of PCT International Application No. PCT/EP2013/001178, filed Apr. 19, 2013, which claims priority under 35 U.S.C. §119 from German Patent Application No. 10 2012 008 003.4, filed Apr. 20, 2012, the entire disclosures of which are herein expressly incorporated by reference.

BACKGROUND AND SUMMARY OF THE INVENTION

The invention concerns a disc brake for vehicles, in particular for commercial vehicles, with brake pads which are arranged on both sides of a brake disc, with a brake application device for applying one of the brake pads on an application side, and with a brake caliper for transferring the application force to the brake pad on the other side, i.e. the reaction side, of the brake disc.

Brake calipers of pneumatically activated disc brakes for heavy goods vehicles are normally produced as castings because of the freedom of design and ease of production. The material used is cast iron with spheroidal graphite in a high strength class.

A generic disc brake is shown in DE 37 16 202. The disc brake disclosed in this publication is activated pneumatically and therefore suitable above all for use in the commercial vehicle sector, where it has also proved successful in practice. A brake caliper made of cast iron is used as a force transmission device to transmit the application force to the brake pad on the reaction side.

These brake constructions, like all axle components of commercial vehicles, face continuous demand to have their weight reduced, since a reduction in weight firstly increases the possible payload, but secondly the reduction in the unsprung mass of the axle components also contributes to protecting the load and improving the driving qualities and hence traffic safety. Weight optimization of the brakes has progressed so far that no further improvement appears possible with the casting materials available without an increased risk of fracture of the brake caliper and/or increased deformation thereof, with the consequence of a deterioration in operating behavior (stroke, response time, compressed air consumption, uneven pad wear, etc.).

Steel appears suitable as an alternative material since very high strength can be achieved, combined with a high elongation at failure and hence a high fatigue strength. And, the around 35% higher modulus of elasticity of steel under the same stress, in comparison with the cast-iron materials previously used, guarantees a low deformation of the caliper. To achieve the desired low weight with low production cost, the use of sheet steel appears suitable. An initial approach for producing a sheet steel caliper as a composite construction is described in DE 196 42 384 A1.

DE 196 42 384 A1 proposes a compressed-air actuated disc brake, the force transmission device of which, to transmit the application force to the brake pad on the reaction side i.e. of the brake caliper, is configured in the manner of a fully closed frame which absorbs the application forces. A modular body holds the brake mechanism and allows pre-assembly. The closed frame is produced from sheet metal in a forming process.

A more extensive, solid sheet steel construction of the brake caliper is not competitive in relation to costing structure, since the waste from the semifinished metal product used has a clearly negative effect on the cost structure of a brake caliper made of sheet steel. The high material cost proportion results substantially from the complex geometry of the brake caliper frame, which necessarily gives a higher waste proportion in a solid sheet steel construction.

The prime development objective however remains an optimization of weight and cost of the disc brake. Because of the dominant weight component, and hence its dominance with regard to the cost structure of a disc brake, attention is focused in particular on the brake caliper for weight and cost reduction. A reduced weight of the brake caliper has a significant effect in reducing the unladen weight, which is an important aspect in particular in commercial vehicle brakes, since a low vehicle unladen weight allows a higher payload.

In addition, due to the lower weight of the brake caliper, the unsprung weight on the vehicle is reduced, which has a positive effect on the agility of the vehicle and on the driving comfort, which, for example, is another important aspect in particular in cars but also in coaches.

The invention is therefore based on the object of creating a disc brake which avoids said disadvantages and which can be produced cost-effectively and hence economically, and which has a significant weight and cost advantage in relation to a disc brake with a one-piece cast brake caliper.

The invention achieves this object in that it creates a disc brake with a brake caliper which, on the reaction side, has a caliper frame made of a formed hollow steel profile to transmit the application force to the brake pad.

This brake caliper frame is now connected by welding with a caliper head produced, for example, as a deep-drawn sheet metal part, but a combination with a cast caliper head is also possible.

With this production method, the material loss is reduced to a minimum. In production of the hollow steel profile, only trimming of the edges is required. The caliper head produced, for example, from sheet metal is a trough-like deep-drawn part which can also be produced without great waste. The necessary welding operations are reduced to connecting the caliper frame to the caliper head.

The U-shaped caliper frame is formed from a hollow profile, wherein the form is greatly determined by the brake disc, the outboard brake pad and the rim and wheel hub rotating about the wheel brake. The smaller the distance from the rotating parts of the wheel, the more construction space is available for the brake, to achieve higher braking performance.

For this reason, the construction space available for the caliper frame is very limited. The lateral tension struts of the caliper frame, which transmit the application force of the brake to the rear, must be located in the annular gap between the brake disc and the wheel rim and offer sufficient clearance to absorb production tolerances, thermal expansion of the brake disc and load-induced deformation. The rear of the caliper frame, via which the reaction force transmitted from the tension struts is introduced into the outboard brake pad, requires a high bending strength, since this feature substantially determines the caliper deformation. Secondly, the axial construction space required by the caliper rear must be as small as possible so that in its installation position, the brake disc can be moved as far as possible to the outside in order to achieve a favorable steering radius.

The result of these peripheral conditions is that the tension struts are constructed very flat in the radial direction and bridge the brake disc relatively widely in order to achieve the necessary cross-section for transmission of the tensile force. In contrast, to achieve a maximum possible bending strength in the axial direction, the caliper rear is constructed as thick as possible, whereby an approximately square cross-section results.

With a caliper frame made from a hollow profile, the problem now exists of configuring these totally different cross-section shapes and dimensioning requirements from a piece of tube with constant diameter and wall thickness. A requirement for forming is, for example, that the length of the peripheral neutral fibers in each cross-section must necessarily be equal to the length of the circumference line on the center diameter of the tube.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a perspective exploded view of the embodiment of a disc brake according to the invention, as shown in FIG. 1;

FIG. 3 is a perspective view of the caliper frame of a formed hollow steel profile of a disc brake, as shown in FIG. 1;

FIG. 4 is a cross-section view taken along section plane IV-IV, shown in FIG. 3, of the caliper frame of a formed hollow steel profile of a disc brake, as shown in FIG. 1;

FIG. 5 is a cross-section view taken along section plane V-V, shown in FIG. 3, of the caliper frame of a formed hollow steel profile of a disc brake, as shown in FIG. 1; and FIG. 6 is a cross-section view taken along section plane VI-VI, shown in FIG. 3, of the caliper frame of a formed hollow steel profile of the disc brake, as shown in FIG. 1.

DETAILED DESCRIPTION OF THE DRAWINGS

Figure 1:
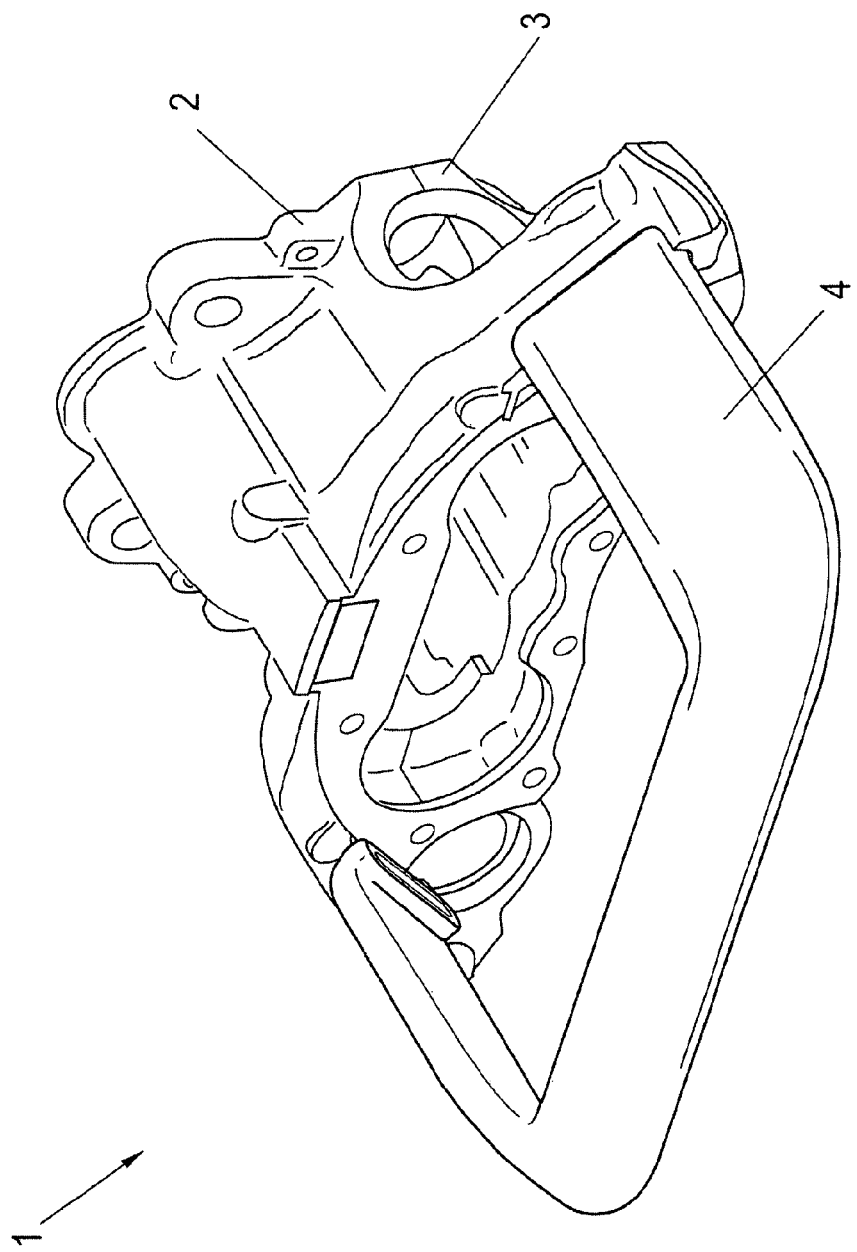
FIG. 1 is a perspective view of an embodiment of a disc brake according to the invention with a casting surrounding the application device, and a caliper frame made of a formed hollow steel profile which forms the reaction-side part of the brake caliper.

FIG. 1 shows an exemplary embodiment of a disc brake 1 according to the invention. For simplification reasons, only the brake caliper 2 of the disc brake 1 is shown. The brake caliper 2 has a housing 3 which receives the brake application device (not shown) of the disc brake 1. The housing 3 in this example is made in a casting process and consequently preferably produced from spheroidal graphite cast iron of high strength. The brake caliper furthermore has a yoke-like caliper frame 4 which is attached to the housing 3.

FIG. 2 shows the fixing of the caliper frame 4 to the housing 3. For this, the housing 3 has pocket-like recesses 5 which have a slot-like geometry and are arranged on both sides of the housing 3. The pocket-like recesses 5, arranged symmetrically in pairs, are open towards the end of the housing 3 on the reaction side. The caliper frame 4, at its two ends of the tension struts 6, has shoulders 12 each bent by 90° in relation to the plane of symmetry defined by the vertical axis of symmetry VSA. The geometry of the shoulders 12 is contour-congruent to the pocket-like recesses 5, so that the shoulders 12 engage in the pocket-like recesses 5 when the caliper frame 4 is in its mounted state.

FIG. 3 shows in detail the yoke-like caliper frame 4. The tension struts 6 of the caliper frame 4 have an oval cross-section with parallel side faces 7, which are evident in FIG. 4 and FIG. 6. The portion of the caliper frame 4 connecting the two tension struts 6 has a D-shaped cross-section 8, which is also evident in FIG. 4. Here the bulging part of the cross-section geometry lies on the side of the cross-section facing away from the brake disc, and the part of the cross-section lying parallel to the vertical axis of symmetry of the tension struts 6 lies on the side facing the brake disc. The 90° bends 9 between the tension struts 6 and the caliper rear 10 of the caliper frame 4 have a transitional cross-section 11, which results from the transition of the oval cross-section with parallel side faces 7 on the two tension struts 6 of the caliper frame 4 and the D-shaped cross section 8 on the caliper rear 10 of the caliper frame 4, and is evident in FIG. 5.

It is essential to the invention that the wall thickness t of the caliper frame 4 is the same at any arbitrary point of the caliper frame 4, and is not substantially changed by the forming processes necessary for production of the caliper frame 4, so that even in the zones with a high forming degree, correspondingly high surface moments of the second order result for the caliper frame 4 which are not reduced by the process-typical material constrictions in the tensile region of a forming zone. Thus the material of the caliper frame 4 can be utilized to the optimum with regard to strength aspects and load-bearing capacity.

In order to achieve a substantially constant wall thickness t over the entire cross-section of the caliper frame 4, according to the invention a multistage forming process is provided, wherein the first stage of the forming process provides a mass predistribution in the region of the caliper rear 10, since otherwise it is not possible in a forming process to achieve a constant wall thickness t in the region of the D-shaped cross section 8, in relation to the wall thickness in the region of the oval cross-section with parallel side faces 7 on the two tension struts 6 of the caliper frame 4, which has a smaller cross-section area than the D-shaped cross section 8 in the region of the caliper rear 10.

In addition, according to the invention, it is proposed that the final step of the multistage forming process is an internal high-pressure forming process, with which in particular the D-shaped cross section 8 is formed in the region of the caliper rear 10, and the transitional cross-section 11 is formed in the region of the 90° bends 9 between the caliper rear 10 and the tension struts 6 of the caliper frame 4.

The basic caliper frame geometry and the shoulders 12 are produced in the hollow profile with a suitable forming method, e.g. swivel bending, wherein the hollow profile preferably has an oval cross-section with parallel side faces 7.

The caliper frame made from tubular steel is connected by form fit to the cast caliper housing and is also welded (FIG. 1 and FIG. 2). However, a bolted connection is also conceivable if corresponding screw inserts containing the nut thread are welded into the tube ends.

In the case of a sheet metal brake housing 3, the connection is made exclusively by welding.

The geometries described above are given merely as examples. To increase the bending strength e.g. of the caliper rear 10, it may also be useful to form the tube wall on opposing surfaces, e.g. the pad contact face and opposite outer wall, partially towards the inside so that these opposing part surfaces come to rest on each other and can be welded.

LIST OF REFERENCE NUMERALS

1 Disc brake
2 Brake caliper
3 Housing
4 Tension struts
5 Pocket-like recess
6 Tension struts
7 Oval cross-section with parallel side faces
8 D-shaped cross-section 9 90° bend
10 Caliper rear
11 Transitional cross-section
12 Shoulder
VSA Vertical axis of symmetry
HAS Horizontal axis of symmetry
t Wall thickness The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc and brake pads, the disc brake comprising:
   a brake application device for applying one of the brake pads against the brake disc on an application side;
   a brake caliper that transfers an application force applied by the brake application device to the one of the brake pads on the application side to another one of the brake pads on a reaction side of the brake disc, wherein
   the caliper comprises a caliper frame made from a closed internal hollow profile.

2. The disc brake according to claim 1, wherein the caliper frame comprises at least one tension strut.

3. The disc brake according to claim 2, wherein the caliper frame comprises a caliper rear.

4. The disc brake according to claim 3, wherein the caliper frame comprises at least one shoulder for fixing the caliper frame to a caliper housing.

5. The disc brake according to claim 4, wherein the tension strut has a substantially oval cross-section with parallel side faces.

6. The disc brake according to claim 5, wherein the caliper rear has a substantially D-shaped cross-section.

7. The disc brake according to claim 6, wherein the shoulder has a substantially oval cross-section with parallel side faces.

8. The disc brake according to claim 7, wherein the hollow profile of the caliper frame has a constant wall thickness.

9. The disc brake according to claim 1, wherein the hollow profile of the caliper frame has a constant wall thickness.

10. The disc brake according to claim 8, further comprising a material bond of the caliper frame to the caliper housing.

11. The disc brake according to claim 8, wherein the caliper frame is fixed to the caliper housing via a form and/or force fit.

12. The disc brake according to claim 1, wherein the disc brake is a commercial vehicle disc brake.

13. A caliper for a commercial vehicle disc brake having a brake disc and brake pads, the caliper comprising:
    a caliper housing in which a brake application device is arrangeable for applying an application force to one of the brake pads on an application side of the brake disc;
    a caliper frame configured to straddle the brake disc and transfer application force applied by the brake application device to the one of the brake pads on the application side to another one of the brake pads on a reaction side of the brake disc, the caliper frame being formed by at least two tension struts and a caliper rear, wherein
    the caliper frame has a closed internal hollow profile.

14. The caliper according to claim 13, wherein the tension struts have a substantially oval cross-section with parallel side faces and the caliper rear has a substantially D-shaped cross-section.

15. The caliper according to claim 14, wherein the hollow profile of the caliper frame has a constant wall thickness.

16. A method of forming a caliper frame of a disc brake, the caliper frame having at least one tension strut and a caliper rear, the method comprising the acts of:
    providing a hollow steel profile by which to form the caliper frame, wherein the hollow steel profile has a mass predistribution in a region that will form the caliper rear; and
    forming the caliper frame comprising the at least one tension strut and caliper rear such that the hollow profile of the caliper frame has a constant wall thickness.

17. The method according to claim 16, wherein the mass predistribution in the region of the caliper rear is provided by an upsetting process.

18. The method according to claim 17, wherein the act of forming the caliper frame comprises a bending process.

19. The method according to claim 18, wherein the bending process is a swivel bending process.

20. The method according to claim 17, wherein the act of forming the caliper frame comprises an internal high-pressure forming process.

* * * * *